No. 782,379. PATENTED FEB. 14, 1905.
C. H. BRYAN.
RUBBER TIRE.
APPLICATION FILED JULY 28, 1904.
2 SHEETS—SHEET 1.
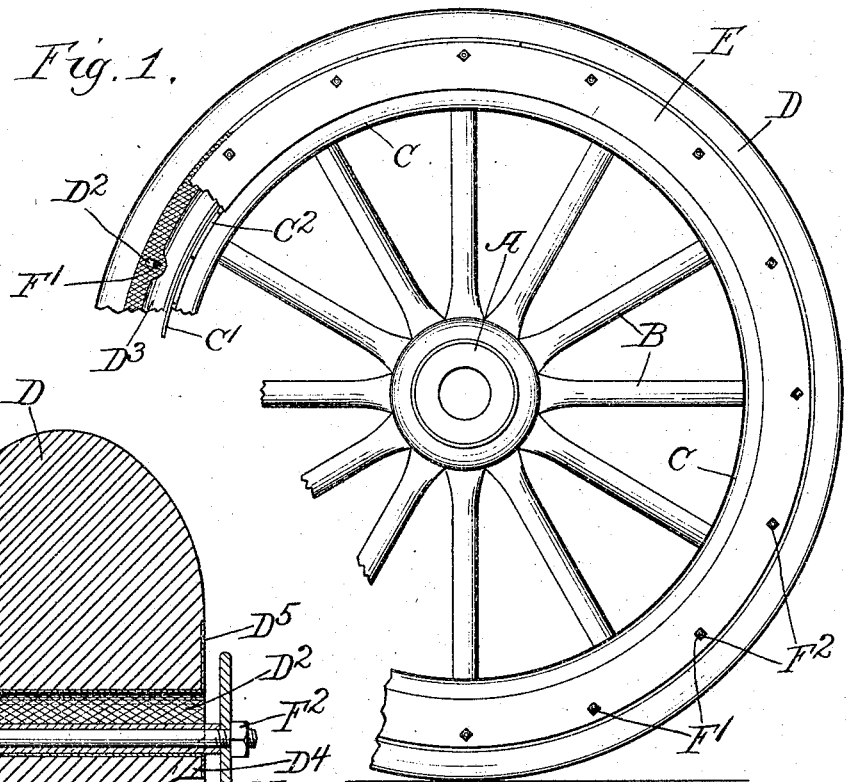
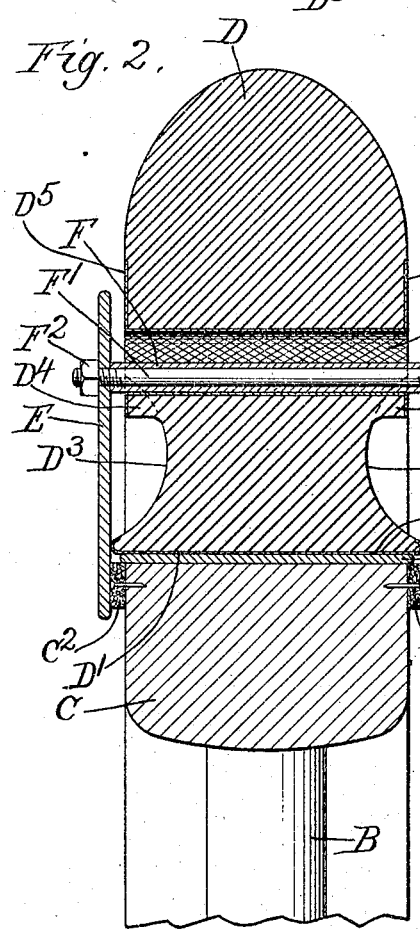
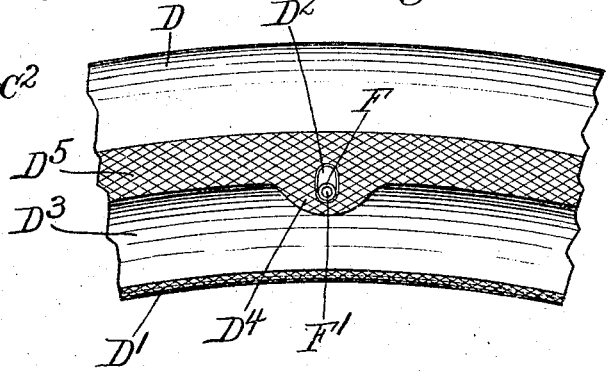
Witnesses.
Edward T. Wray
Homer L. Kraft
Inventor.
Clarence H. Bryan,
by Parker & Carter
Attorney's.

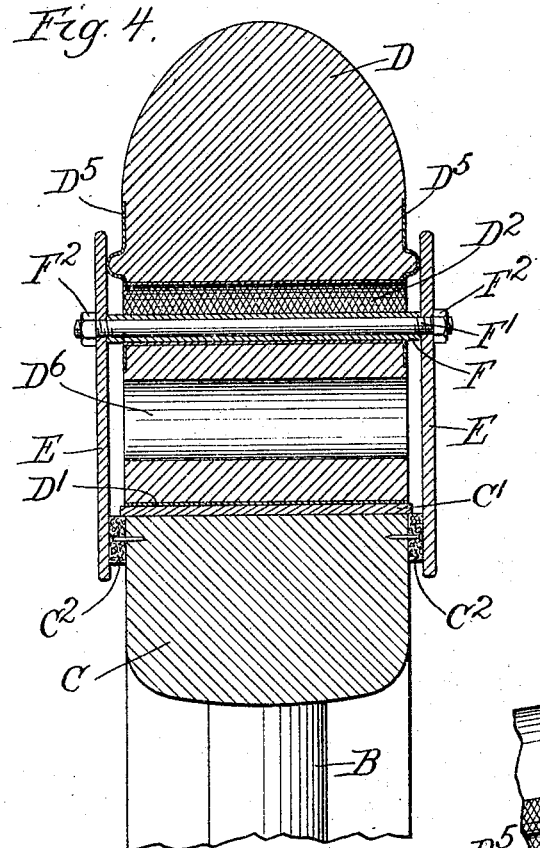
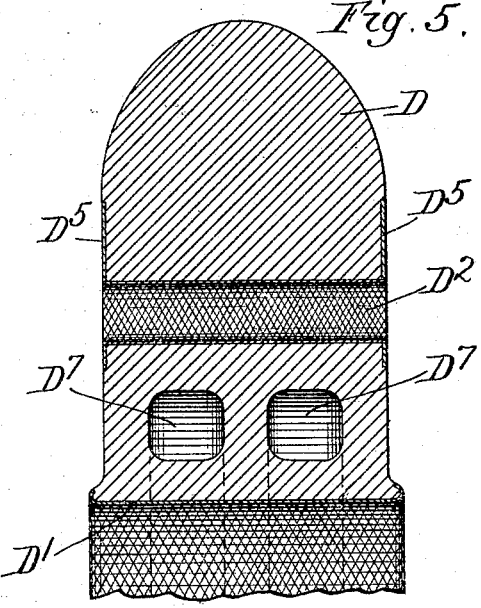
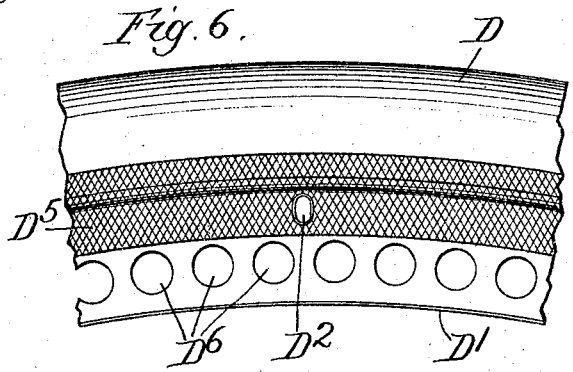

No. 782,379. Patented February 14, 1905.

UNITED STATES PATENT OFFICE.

CLARENCE H. BRYAN, OF CHICAGO, ILLINOIS.

RUBBER TIRE.

SPECIFICATION forming part of Letters Patent No. 782,379, dated February 14, 1905.

Application filed July 28, 1904. Serial No. 218,470.

*To all whom it may concern:*

Be it known that I, CLARENCE H. BRYAN, a citizen of the United States, residing at Chicago, in the county of Cook and State of Illinois, have invented a certain new and useful Improvement in Rubber Tires, of which the following is a specification.

My invention relates to elastic tires for vehicle-wheels and the like, and has for its object to provide new and improved constructions for such devices.

My invention is illustrated in the accompanying drawings, wherein—

Figure 1 is a side view of a vehicle-wheel with part of the flange device broken away. Fig. 2 is a sectional view of the tire and felly on a radial line of the wheel. Fig. 3 is a side view of a portion of the tire shown in Fig. 2. Fig. 4 is a sectional view showing a modified form of the tire. Fig. 5 is a section through another modified form of tire. Fig. 6 is a side view of a portion of the tire shown in Fig. 4.

Like parts are indicated by like letters in all the drawings.

A is the hub of the wheel; B B, the spokes; C, the felly, which may be made of wood or any suitable material and is preferably provided with a metal hoop or shoe $C'$ and annular washers $C^2 C^2$, composed of leather or other suitable tough material.

D represents the tire, made of rubber or other resilient material and which is preferably of the dimensions shown—that is, about the width of the wheel-felly, but with its radial thickness considerably greater. The tire is given a somewhat flat seat upon the felly and is protected at this place by a covering of tough fabric, as shown in $D'$. The tire D is held to its position upon the rim and prevented from bending laterally by a movable cage-like fastening and guiding device. To this end the tire is pierced at intervals approximately midway between its seating portion and the tread by a series of perforations $D^2$, extending from side to side. These perforations are somewhat enlarged or elongated radially for the purpose that will appear later. On each side of the wheel I provide the annular flanges E E, which extend along the side of the tire and of the felly, the latter being protected from wear by the washers $C^2 C^2$. These flanges are held in proper relation by the sleeves F, which pass through the perforations $D^2$ and are secured by bolts $F'$, passing through the sleeves, and the nuts $F^2$. The sleeves hold the flanges approximately parallel and slightly removed from the side of the tire. In order to prevent wear, the perforations are lined with a tough fabric, and the sides of the tire, near the perforations, are covered with a like material, as shown at $D^5$. In order to provide for the compression of the tire, the mass of the tire is reduced within the flange devices. This may be done by making annular grooves in the sides of tire, as shown at $D^3 D^3$ in Figs. 2 and 3. However, the purpose being to reduce the mass of the tire which is within the holding device so that the tire may be made more resilient and accommodated to act within the holding device, this purpose is susceptible of accomplishment in more than one way. For example, as shown in Figs. 4 and 6, the tire may be perforated with a series of transverse holes $D^6$, extending from side to side of the tire, or, as shown in Fig. 5, it may be provided with one or more annular channels $D^7$, extending longitudinally. In such cases the tire need not have the grooves or depressions on the sides, as shown in Figs. 2 and 3. Obviously this end could be accomplished in numerous different ways, and therefore I do not limit myself to the particular forms of tire shown. To strengthen the tire, in the form of tires in Figs. 2 and 3 at the places where it is pierced for the bolts I preferably make it with the lugs $D^4$. The bolt-holes are made oval in shape and approximately twice as long as they are wide. However, this shape and these dimensions are not material to my invention. As an aid to holding the tire in position, the seating part of the tire may be made to extend beyond the felly, as shown in Figs. 2 and 5, so that it will contact with the flanges E E.

In the foregoing description I have described three particular forms of my invention; but it is obvious that they might be modified in many respects without departing from the broad spirit of my invention. The tire might be given a considerably different shape from those shown and might be made of any suitable material and either in one piece or in sections. The dimensions, forms, and constructions might clearly be considerably changed without departure from the intent and purpose of my device, and therefore I do not limit myself to the particulars shown.

The use and operation of my invention will perhaps have been sufficiently clear from the foregoing. Suffice it to say that by the use of this device I am able to have a tire which is very resilient, the whole mass of the rubber or other material being capable of compression under the load. This follows from the fact that the tire is not confined in an immovable groove, but is free to move throughout its entire thickness. The elongation of the bolt-holes permits play between the tire and the cage-like holding device, with the result of giving added resiliency and also saving wear and tear upon the tire at the place where it is so connected. The tire when compressed will first be crushed down upon the sleeves and then with further pressure will force the holding device inwardly. I find that this results in a high degree of elasticity and great durability.

I claim—

1. The combination of a vehicle-wheel with an elastic tire having apertures therein and means to connect the tire with the rim comprising members movable with respect to the rim and adapted to extend into the apertures, such apertures being of sufficient size to permit play between such members and the tire, when the tire is in use.

2. The combination of a vehicle-wheel with a tire of resilient material, radially-elongated apertures through the tire, and a device connecting the tire to the rim, comprising members passing through such apertures and movable with respect to the wheel.

3. The combination of a vehicle-wheel with an elastic tire, perforations through the tire, annular guide-flanges, sleeves passing through the perforations and adapted to hold the flanges in proper relation to the rim and the tire and bolts rigidly securing together the flanges and the sleeves.

4. The combination of a vehicle-wheel with a tire of considerable radial thickness in proportion to its lateral thickness, radially-enlarged perforations approximately midway between the tread and the seating portion of the tire, a connecting device comprising annular flanges adapted to make a sliding connection with the wheel, bolts passing through such perforations and secured to the flanges and sleeves surrounding the bolts.

5. The combination of a vehicle-wheel with a tire of considerable radial thickness in proportion to its lateral thickness, radially-enlarged perforations approximately midway between the tread and the seating portion of the tire, a connecting device comprising annular flanges adapted to make a sliding connection with the wheel, bolts passing through such perforations and secured to the flanges and sleeves surrounding the bolts, such tire provided with a relatively flat bearing on the wheel-rim and adapted to contact with the flanges at this place.

6. The combination of a vehicle-wheel with a tire of considerable radial thickness in proportion to its lateral thickness, radially-enlarged perforations approximately midway between the tread and the seating portion of the tire, a connecting device comprising annular flanges adapted to make a sliding connection with the wheel, bolts passing through such perforations and secured to the flanges and sleeves surrounding the bolts, such tire provided with a covering of tough fabric on the portion bearing upon the rim.

7. The combination of a vehicle-wheel with an elastic tire and a guiding device to hold the tire in place on the rim of the wheel, such device movable with respect to both the tire and the wheel.

8. The combination of a vehicle-wheel with an elastic tire and a guiding device movable with respect to the wheel to hold the tire in place on the rim of the wheel, the portion of the tire within such guiding device being reduced in volume.

9. The combination of a vehicle-wheel with an elastic tire and a movable guiding device to hold the tire on the rim of the wheel, the portion of the tire within such device being perforated.

10. The combination of a vehicle-wheel with an elastic tire and a movable guiding device to hold the tire in place on the rim of the wheel, the portion of the tire within such guiding device having transverse perforations therethrough.

11. The combination of a vehicle-wheel with an elastic tire and a guiding device movable with respect to both the tire and the wheel to hold the tire in operative position relative to the wheel, the portion of the tire included by the guiding device being of a size and shape to permit the displacement of the material of the tire under the resilient action thereof.

CLARENCE H. BRYAN.

Witnesses:
HOMER L. KRAFT,
PERCIVAL W. TRUMAN.